Feb. 23, 1971  P. J. GRESHAM  3,565,797
APPARATUS AND PROCESS FOR TREATING SEWAGE
Filed June 12, 1968  3 Sheets-Sheet 3
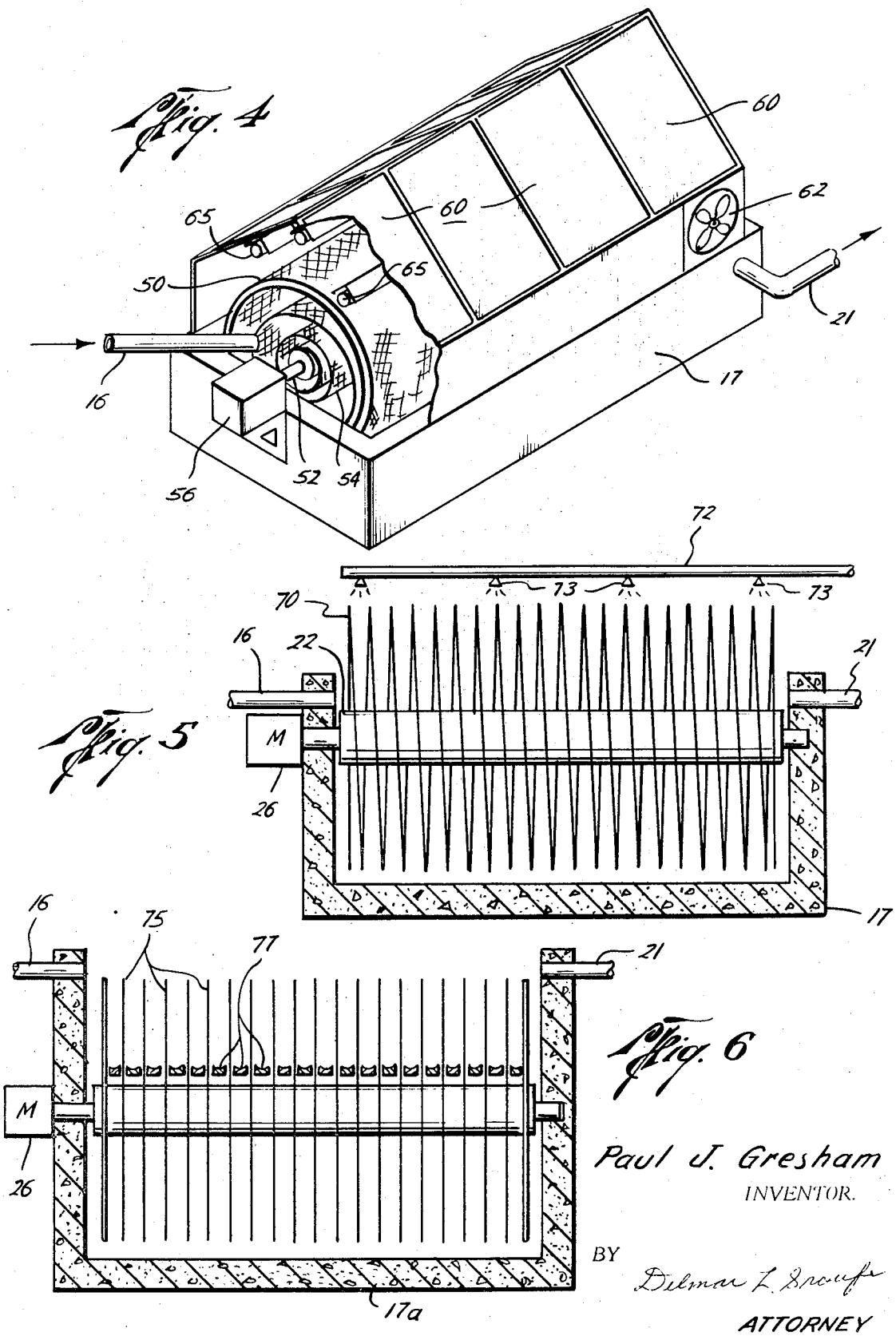
Paul J. Gresham
INVENTOR.
BY
ATTORNEY

United States Patent Office 3,565,797
Patented Feb. 23, 1971

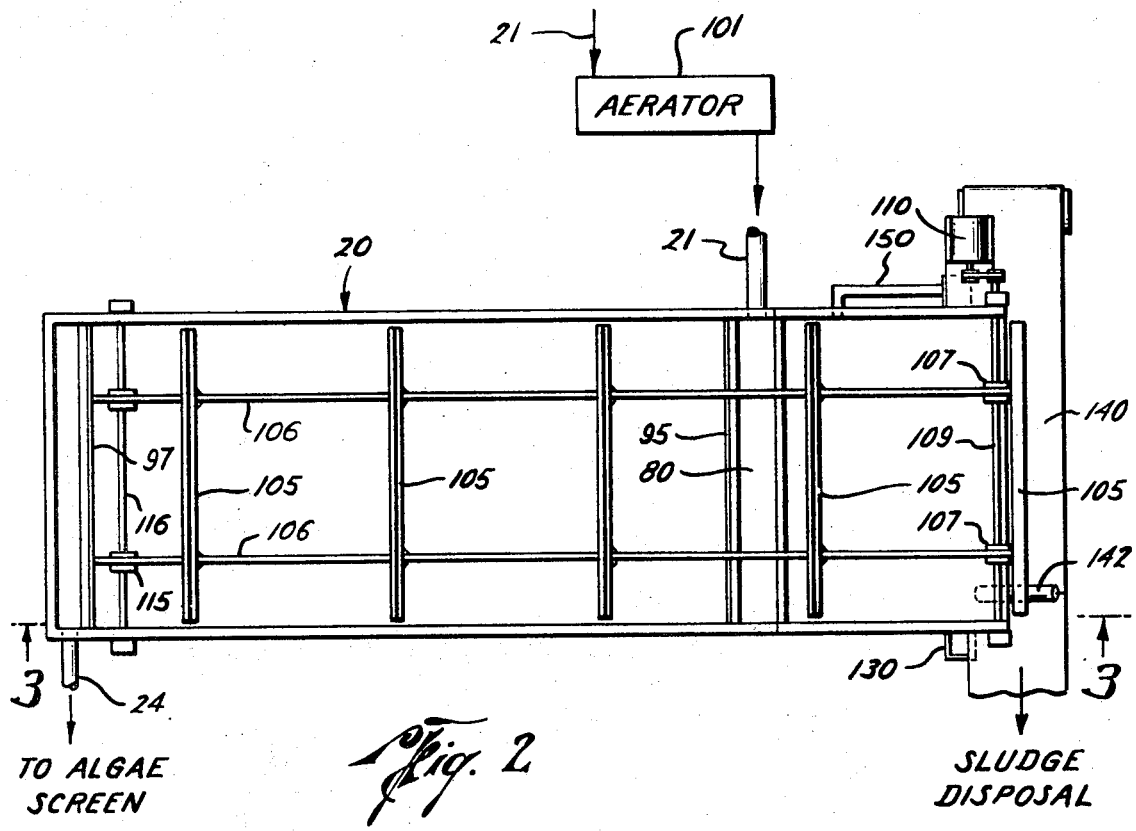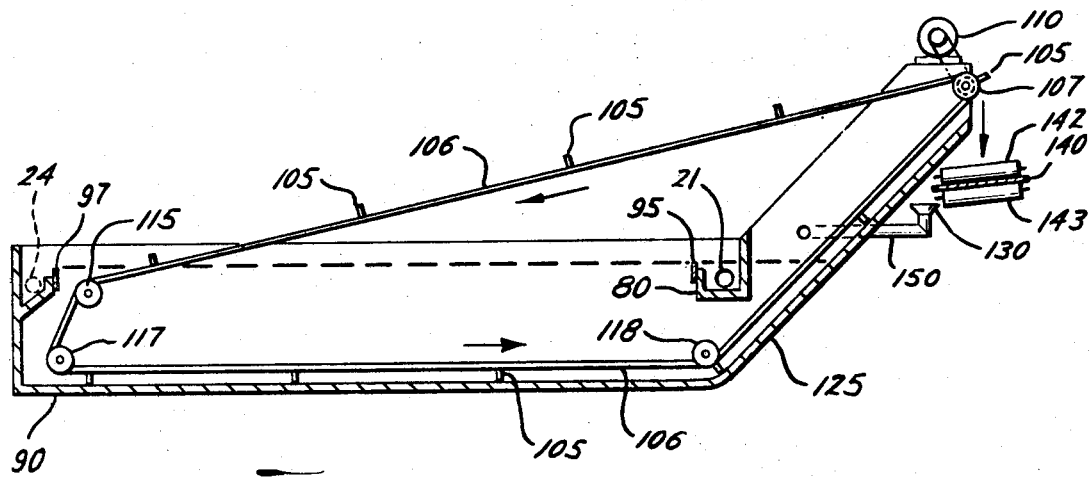

3,565,797
APPARATUS AND PROCESS FOR
TREATING SEWAGE
Paul J. Gresham, Oklahoma City, Okla.; now by Court
 Order of two-thirds interest to Carolyn Louise Gresham
 widow of Paul J. Gresham, deceased, and one-sixth
 each to Ralph R. Gresham, Houston, Tex., and James
 R. Sutton, Grand Island, Nebr.
Filed June 12, 1968, Ser. No. 736,348
Int. Cl. C02c 3/00
U.S. Cl. 210—10                                    18 Claims

ABSTRACT OF THE DISCLOSURE

Apparatus and process for the treatment of sewage by oxidation and by contacting said sewage with living filamentous algae affixed to a suitable supporting framework. Several stages of treatment may be used, but a single stage of treatment through moving contact of the sewage with an algae bed or screen of sufficient size will provide complete or almost complete removal of suspended solids, and the biochemical oxygen demand of the effluent water can be reduced to acceptable levels for disposal in streams and lakes.

---

The algae utilized in this invention grow rapidly, trapping suspended solids and removing dissolved organic matter to utilize both types of materials as food. Through photosynthesis the organic material is converted to new compounds by the algae and oxygen is released. The oxygen released by the algae oxidizes sewage solids. One aspect of this invetnion is the discovery that oxidation of sewage solids causes sludge separation and compaction. Moreover, the coagulating effect of algae filaments together with the effect of oxidation produces a heavy, dense sludge which can be readily compacted by the compression created by scraping mechanisms moving such sludge up an incline to a point above the water line. The compacted sludge can be further compressed to remove a substantial portion of its water content, producing a relatively dry sludge which is in a form suitable for incineration or other disposition.

BACKGROUND OF THE INVENTION (1) Field of the invention

This invention relates to the treatment of sewage.

The principal purpose of sewage treatment is to restore the water in sewage to its original condition, or as nearly so as is necessary to maintain purity of the available stream or body of water receiving the effluent water. In many cases the stream or lake receiving the effluent water from sewage treatment is the source of the water supply for a town or city. Under such circumstances a high degree of sewage treatment is required.

(2) Description of the prior art

Treatment processes now exist to give sewage almost any desired degree of treatment, but methods for high-degree treatment are complex and expensive as well as time and space consuming. The most important and difficult part of conventional sewage treatment processes is sedimentation. As now practiced, sedimentation or solids removal is never complete, and sludge disposal is difficult and complicated.

The two most widely used processes for the treatment of sewage are known as the trickling filter process and the activated sludge process. Both processes require a substantial series of treatment steps. The preliminary treatment alone includes the removal of paper and large solid objects from the sewage; grease removal; preliminary or primary sedimentation and sludge digestion. The effluent water from the primary sedimentation tanks may be further processed by a trickling filter unit in the so-named process or by aeration tanks in the activated sludge process. Primary sedimentation is followed by a secondary or final sedimentation in each of these processes, and the sludge resulting from both the primary and subsequent sedimentation stages is accumulated in sludge digestion tanks where it is treated by digestion with anaerobic bacteria. The digestion process is exceedingly slow and inefficient, and although the sludge is reduced in volume the digestion does not dispose of a considerable residue of organic solids. The digested sludge may be distributed on sand drying beds for drying over a considerable period of time or the sludge may be washed with fresh water, resettled, or otherwise conditioned for dewatering by centrifuge or vacuum filters. The process is complicated because there is not presently known any method for completely and efficiently separating suspended solids from the effluent.

The clarified effluent from the conventional digestion plant is discharged into streams, lakes or oceans for dilution. Final treatment with such processes is achieved by the process known as "self purification of streams."

SUMMARY OF THE INVENTION

A primary object of this invention is to provide improved sewage treatment processes and apparatus capable of rapidly removing suspended solids from said sewage.

A further object of this invention is to provide sewage disposal methods and apparatus for the treatment of sewage by means capable of processing higher volumes of raw sewage for each unit processing area than the amount processed by conventional sewage processes.

Another object of this invention is to provide sewage treatment processes and apparatus capable of producing a compact, easily dewatered sludge which may be easily disposed of by incineration.

A still further object of this invention is to provide a process and apparatus for the removal of nitrates and phosphates from sewage.

Other objects and advantages of this invention will be apparent from the following description of the present invention, the drawings and appended claims.

The foregoing objects are achieved in the practice of this invention by oxygenation of the sewage and by rapid sedimentation. In a preferred embodiment oxygenation and removal of solids is facilitated by providing a supporting member for the growth of living algae and means for moving such supporting member through said sewage and to expose the algae to light for sufficient portions of time to maintain the growth of the algae. In several illustrated embodiments, rotating supporting members are provided for the growth of said algae. A substantial portion of the supporting member may be disposed above the surface level of the sewage in order to provide exposure to light and by its rotation to transmit to the sewage dissolved oxygen from the atomsphere. In another embodiment, adapted for the treatment of sewage of low enough density to permit substantial light penetration, the entire moving framework may be disposed below the liquid surface. In any event it is necessary that the algae be maintained in a wet condition either by maintaining it submerged; by retaining moisture thereon by centrifugal force; or by the addition of water to the algae while exposed to the atmosphere, for example, by sprinkling or spraying water on the portion above the liquid surface. It must also be provided with sufficient light, either natural or artificial, to maintain algae growth, and it must be protected from freezing or near freezing temperatures.

The algae utilized in the practice of this invention are of the types naturally occuring in sewage. Such algae are filamentous types having extended filaments. These filaments are coated with a sticky mucous which siezes and holds solid particles, including colloidal particles. Filament particles loaded with sewage solids are broken off by the scouring action of the liquid as the bed of supporting framework is moved through the sewage. Sewage solids which are tapped on such algae filaments may be held for hours before each filament breaks off from the supporting bed of algae and the resulting mass of sludge settles in a coarse, heavy and well-oxidized form.

The oxidization of the solids by the algae treatment or by any suitable means, and in the preferred embodiment with the additional coagulating effect of the algae filaments, results in a sludge which can be readily compacted. Such compacting is accomplished in a preferred embodiment by compression created by a scraping mechanism moving the sludge up an incline to a point above the water line. The compacted sludge may be further compressed by compression rollers or other suitable means to remove a substantial portion of its water content, thereby producing a relatively dry sludge which is in a form suitable for incineration or other disposition.

A further distinction between the treatment of sewage by the present invention compared with the conventional bacteriological processes, it that bactria and lower forms of animal life, such as protozoa, decompose sewage and then add their own dead bodies to the oxygen-demanding waste substances. This treatment is long-drawn-out, expensive and complicated.

It is true that with a properly designed bacteriological plant, the effluent water has a large proportion of suspended solids removed and the bacteria converts the remaining solids into plant food in the form of nitrates, phosphates, sulfates, etc., which are carried by the water effluent into some natural body of water for dilution and continued treatment by natural occuring plant and animal life. It is now recognized that such nitrates and phosphates in sewage water have increasingly become a problem because they cause a great increase in the amount of algae in our lakes and streams. Such algae blooms in sources of water supply create a nuisance by clogging water filters and equipment and by creating tastes and odors in the water.

The process of this invention more nearly achieves the desired function of discharging water with only its natural mineral elements because it uses the plant life portion of the cycle of life and death instead of the death and decay portion. Nitrates, phosphates and their antecedents are plant foods, and as such, are assimilated by the algae by photosynthesis. At night photosynthesis may be continued if artificial light in the visible range from red to yellow, and sometimes blue, is supplied. Oxygen is a by-product of photosynthesis and is useful during the present process in killing off anaerobic bacteria.

BRIEF DESCRIPTION OF THE DRAWINGS

Turning now to the drawings.

FIG. 2 is a plan view of a clarifier used in the present invention;

FIG. 3 is the sectional view of the clarifier of FIG. 2 taken along lines 3—3;

FIG. 4 is an axonometric projection, partially cut away, of an algae filter unit for sewage treatment;

FIG. 5 is a somewhat schematic sectional view of an alternate algae filtering device; and FIG. 6 is a sectional view of another alternate embodiment of an algae filtering apparatus used in the present invention.

DESCRIPTION OF THE PREFERRED EMBODIMENTS

Figure 1:
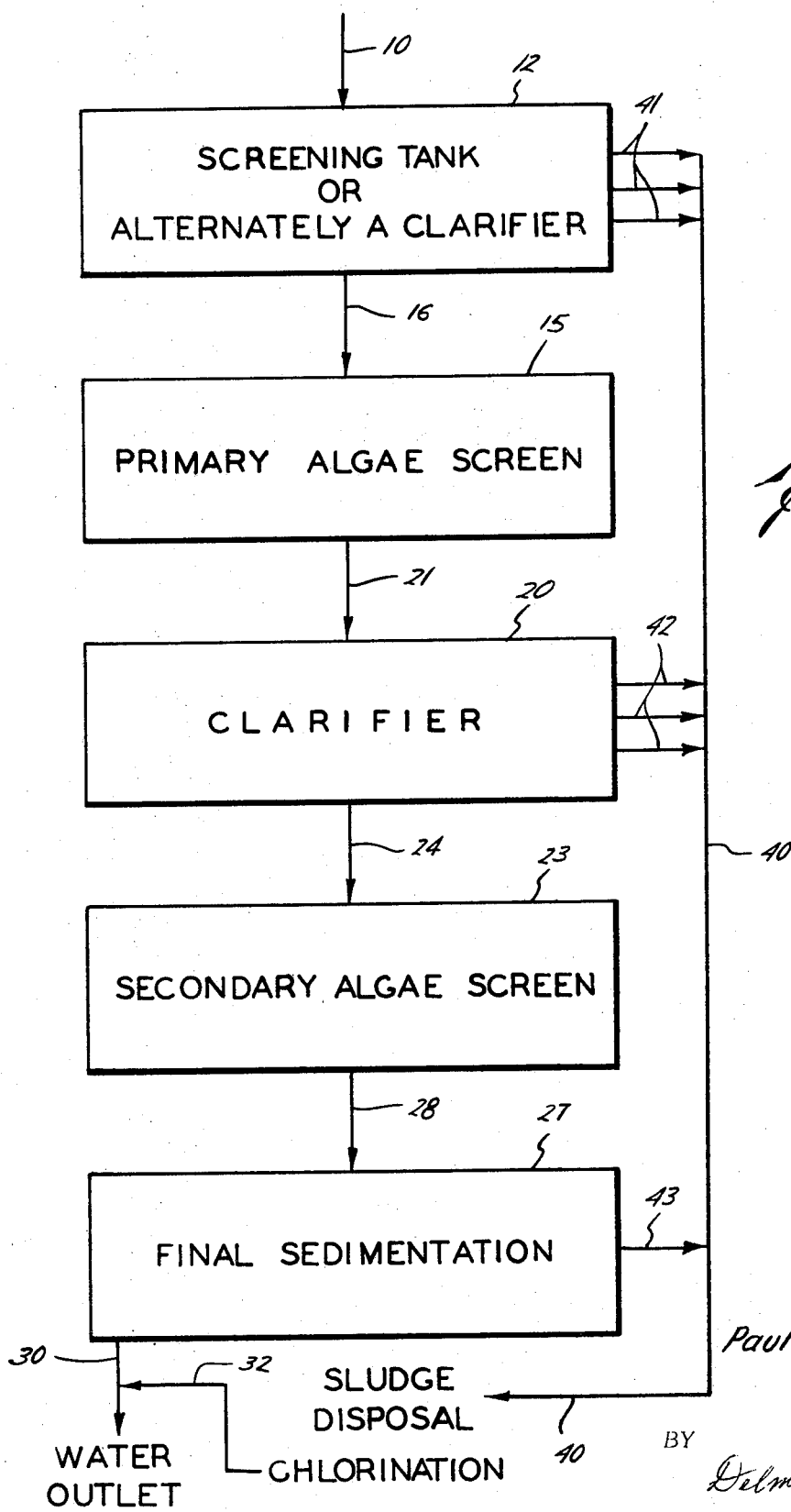
FIG. 1 is a flow diagram of a sewage processing plant embodying the present invention.

Heretofore, algae have never been successfully used in sewage treatment plants because algae must have light for a large portion of the time to grow. During daylight hours algae gives off oxygen as a by-product and at night it produces carbon dioxide. If all light is cut off, it will ultimately die. Sewage is so turbid that algae never forms in treatment plants in sufficient quantities to be utilized under ordinary conditions, but if sewage is clarified and exposed to sunlight or daylight or certain types of artificial light, algae will grow profusely and in such circumstances the algae will metabolize sewage far more rapidly than it can be treated bacteriologically. Treatment is more complete as well as more rapid, since bacteriological treatment is a process of decay whereas algae treatment is one of conversion of said organic matter to live, healthy plant life which can be utilized for fertilizer, or be readily burned to an irreducible mineral ash.

The bacteriological treatment of sewage requires oxygen in large quantities from the atmosphere; in contrast, algae treatment requires no oxygen but generates oxygen as a by-product. The oxygen released into the sewage by algae contributes materially to the removal of solids from the sewage. It has been found that if a small amount of dissolved oxygen is introduced into settling sewage, the solids settle far more quickly and the sludge coagulates better, coheres better and is freely drainable so that it can be compacted and removed by any suitable means such as by scrapers drawing the sludge up an incline to the surface of the tank.

In one aspect of the present invention, the dense mat of algae which is used to grow upon the supporting members functions as a mechanical filter. In early attempts to utilize the filtering property of filamentous algae by causing diluted sewage to pass through a dense mat of such algae, the mat soon became clogged by solids it trapped. Such solids then exclude light from the mat and the algae die. By moving the bed of algae through the sewage at sufficient velocity to create a scouring action, the solids-loaded filaments break off exposing new filaments for filtering action. Moreover, mechanical clogging is avoided and the algae is alternately exposed to the light to maintain its growth and submerged in the sewage to function as a filter.

Such exposure to light will usually be achieved in adequate amounts during daylight hours. It should be noted, however, that too much direct sunlight is harmful to algae, and even the rotation of the bed of algae may not be sufficient in all cases to prevent overexposure. Under natural conditions the full rays of the sun rarely fall on algae, since at least a few centimeters of interposed water will normally be present. To avoid overexposure to extremely bright sunlight, shade means may be used, and conversely in the winter season artificial light may be required to supplement the natural sunlight.

Although there are thousands of species of algae, the present process uses algae which may be broadly classed as multicellular filamentous non-microscopic algae which is capable of attaching itself to fixed media, such as a metal skeletal framework or formaminous body. Preferably the algae should also be of the type which sheathes itself in a sticky, gellatinous film capable of sizing and holding solid particles of all types including colloidal material and bacteria. This type of algae is inherent in sewage.

The supporting framework of this invention when maintained wet may be manipulated to expose it to sunlight or suitable artificial light, and alternately to submerge it into contact with the solid content of said sewage. Such alternate exposure to light and sewage has been found to promote the growth of algae resulting in the formation of a heavy mat of algae on the framework. This mat of algae constitutes a true filter of the highest order, removing all particulate matter mechanically and unloading such material in tightly bound aggregates quite different from the commonly known flocculent solids. Most of the bacteria in the sewage are bound up in the solids which after unloading from the filter are quickly removed by shallow sedimentation.

The effect of oxygen upon sewage solids in the sedimentation process has not been known prior to the present invention. In this regard, it should be recognized that in most cases sewage reaches a treatment plant is a slightly septic or anaerobic condition, with no dissolved oxygen present. The solid particles in strictly fresh condition, which is seldom seen in a treatment plant, have a sticky gellatinous texture or film which causes them to cohere well after they have been flocculated or coagulated. Such sewage floc is a delicate structure and easily broken up. A shallow clarifier with short retention time may be used for the removal of a substantial portion of the solids of incoming raw sewage before anaerobic bacteria have acted upon the sewage.

Moreover, it has been found that if the anaerobic condition of the sewage is reversed by the introduction of dissolved oxygen by any means, before anaerobic bacterial action has destroyed the coherence of the solids, the solids retain the gellatinous or mucous structure and flocculant aggregates quickly form which speeds up the settling rates of the solids very greatly. If the presence of dissolved oxygen is not maintained during the greater part of the sedimentation detention time, anaerobic bacterial action will be re-established, the solid particles will not cohere as well, the particles will break down into smaller and lighter particles, and sedimentation rates will be slower. Moreover, gas will be formed which still further slows the settling rate. These are the principal factors which have in the past dictated the use of large clarifiers with long detention periods to permit the maximum of quiesence of flow during sedimentation.

Referring to the drawings, apparatus is shown in which two contacting screens are provided. Raw sewage is introduced into the treating plant through pipe or conduit 10. It is usually desirable that the paper and coarse solids content be removed initially by means such as a conventional screen or by a clarifier as indicated by the numeral 12 in the flow diagram. The sewage is conveyed by conduit 16 directly from the raw sewage screen or clarifier 12 to the primary algae contacting screen 15 where it is intimately contacted with living filamentous algae.

The sewage, including coagulated solids, is passed to the clarifier 20 through conduit 21 where sedimentation and separation of the sludge solids occurs. The effluent liquid from the clarifier, containing some suspended and dissolved solids is then conveyed to a secondary algae screen 23 through conduit 24. In the secondary algae screen, substantially all of the suspended and dissolved solids are removed from the liquid and ultimately precipitated as a sludge which is conveyed with the effluent liquid from the secondary screen to a final clarifier or sedimentation tank 27 through conduit 28. In the final sedimentation tank the coagulated solids are permitted to settle and are removed from the water which discharges through the water outlet 30. In most instances the effluent water from the final sedimentation tank will be of suitable purity to be discharged directly into any available lake or stream; however, as indicated in the flow diagram, chlorination by the introduction of chlorine or chlorinating chemicals through line 32 may be added to further reduce the biochemical oxygen demand (B.O.D.).

The sludge removed from the screening tank or clarifier 12 together with sludges from clarifier 20 and final sedimentation tank 27 are conducted to a conveyor means 40 by conduits 41, 42 and 43 respectively. In one utilization of the invention it is contemplated that the sludge removed from the plant will be incinerated. The sludge may be compressed by rollers to remove a portion of the water, air dried, or a portion of the water may be otherwise removed prior to incineration. Moreover, it is within the contemplation of this invention that the sludge may be utilized as a raw material to be processed for fertilizer, animal feeds or chemical products. In some instances sludge from the initial screening tank may be incinerated and the sludge from clarifiers following the primary and secondary algae treatment steps may be separately removed for further processing to product fertilizers, animal feeds or chemical products.

In FIG. 4, a unit embodying a moving bed algae filter, or contacting unit is illustrated. Raw sludge, preferably with paper and large particles removed by the screen or clarifier unit 12, which may be of conventional design, is introduced through conduit 16 into tank 17. Within the tank 17 a horizontally disposed spiral framework 50 is rigidly mounted on a rotatable shaft 52 in order that it may be rotated by suitable means such as motor 56. The supporting framework may be of any desired foraminous construction, such as wire screen material having wire strands preferably spaced not more than about 2 inches apart and desirably not more than 1 inch apart in order to permit a screening growth of algae across the openings. Several layers may be spaced radially about the axis as suporting means which will permit the algae to grow in a thick mat. The openings in the foraminous framework and the spacing of successive layers of algae supporting framework is not critical, and to some extent it will be apparent that the selection of the screen size or foraminous opening size will affect the spacing and the number of desirable innerlayers of supporting framework. If very large screen openings are used, the algae mat will tend to have openings permitting more light to reach the innerlayers of framework and thereby promote the growth of algae on the innerlayers. On the otherhand, if a very fine screen size is used, the algae growth on the outer screen layer will prevent the penetration of light into the innerlayers and render the use of more than one innerlayer undesirable.

A housing having glass windows 60 may be placed over the unit during all or part of the year for the algae filter units of my invention as shown in FIG. 4. A suitable ventilating means 62 may be provided to permit control of heat, to provide adequate air for algae growth and to remove carbon dioxide given off by the algae during hours of darkness if artificial light is not used. The glass panels 60 may also be used to filter damaging ultra violet light from the sunlight to protect the algae. It will be understood that the housing may be varied in design to accommodate needs for servicing, testing, maintenance, etc. for any specific size filter unit which may be used in accordance with principles known to those skilled in the art.

Artifiicial lights 65 may be provided in order to supplement the natural sunlight during winter months, and, if desired, to promote algae growth during the night. In the embodiment of FIG. 4, effluent discharge conduit 21 conveys the treated sewage from tank 17 to the clarifier 20.

A horizontally disposed helical screen or foraminous supporting framework is illustrated in FIG. 5. In this embodiment of the invention the supporting framework 70 for the growth of the algae bed is rigidly affixed to axle 22 for rotation by motor means 26 within the tank 17. Also illustrated in this embodiment of the invention is a water spraying apparatus comprising a water line 72 and sprinkling nozzles 73. Water may be pumped from any source such as the effluent water from the clarifier 20 or it may be supplied from the sewage plant's water system.

In still another embodiment of the moving algae filter bed, a supporting framework for the algae is provided by means of a series of foraminous discs 75 extending radially from the axle 22 and mounted rigidly thereon for rotation with said axle by motor means 26. In the embodiment illustration in FIG. 6 it will be noted that the tank 17a has the sewage inlet 16 and the outlet 21 located above the top of discs 75 in order that the entire rotor, including the supporting framework for the algae bed will be disposed below the liquid surface. Such arrangement may be used with any desired configuration of algae supporting members, such as the members illustrated in FIGS. 4 and 5, and further, the foraminous discs 75 shown in FIG. 6 may be used in tank 17 wherein the liquid level is maintained at approximately the center of the rotating framework. In the embodiment illustrated in FIG. 6, cutter blades 77 are provided between the rotating discs to cut the extending mat of algae growing on each of the supporting foraminous discs and to thereby insure uniform growth of algae across the entire disc area.

The treated effluent sewage from the algae screen 15 is conveyed by conduit 21 to a clarifier or sedimentation tank. Conventional clarifiers or sedimentation tanks may be used with the algae filter; however, in a preferred enbodiment of this invention, a clarifier as shown in FIGS. 2 and 3 is provided. A single settling tank is illustrated but it will be understood that a series of relatively shallow settling tanks may be used to provide the desired sedimentation area.

The sewage passing to the clarifier may be raw sewage or sewage processed by any means to inhibit anaerobic action. Preferably sewage from algae treatment, such as the algae screen unit 15, is conveyed by conduit 21 to distribution trough 80, disposed in each settling tank or basin 90. Any desired number of settling tanks 90 may be used. The sewage is distributed in the settling tanks over weir 95 in the distribution trough 80. Flow of fluids in the settling tanks of the clarifier passes from the weir 95 over the weir 97 into conduit 24. In some cases the features of the unique clarifier of my invention may be used for the removal of solids from raw sewage or sewage treated under conditions preventing anaerobic action. For such installations any suitable means for oxygenation of the sewage, such as air aerator 101, may be used to introduce oxygen into the sewage entering the clarifier. Such oxygenation will not be normally required for sewage from the algae filtering unit.

Sludge scrapers 105 are carried by chains illustrated in FIG. 2 as duplicate chains 106 which are driven by sprockets 107. Sprockets 107 are rigidly mounted on shaft 109 which is rotated by a suitable motor means such as motor 110. Scrapers 105 are conveyed by scraper chains 106 around idler sprockets 115 mounted on shaft 116 and around idler sprockets 117 and 118 to provide scraping action along the bottom of settling basin 90. Sprockets 107 and sprockets 118 are disposed so that the scraper 105 is caused to convey sludge from the bottom settling tank 90 up its inclined end 125, thereby compressing the sludge and moving it above the liquid level to partially dewater it and to discharge it over the inclined end 125 onto conveyor belt 140. If further drying is desired, several compression rollers, such as compression rollers 142 and 143 may be provided along belt 140 to compress and dewater the sludge. The conveyor belt may be inclined slightly as it passes through the compression rollers 142 and 143 to cause the extruded water to flow into trough 130, and through conduit 150 which is provided to convey away water removed from the sludge on the conveyor belt. Such water may be conveniently discharged into the tank 17 or returned to settling basin 90 as desired.

In the operation of the apparatus of this invention, it is contemplated that any desired number of algae filtering units may be used. In fact, a single large algae contacting screen for the processing of raw sewage with sufficient detention time to fully precipitate or coagulate the sludge may be used with a single clarifier to separate the precipitated sludge. As noted in FIG. 1, however, it is further contemplated that sewage processing may employ two or more contacting units and in such case the secondary algae screen, and any additional algae screens or contacting units, will normally be identical to those heretofore illustrated, but each succeeding unit may be much smaller than the preceding unit. The use of a fully submerged rotor is presently preferred for the secondary algae contacting unit since the effluent from clarifier 20 will be relatively clear and permit the penetration of light through the liquid to a sufficient depth to permit the growth of algae. Even at relatively high processing rates the first unit will normally precipitate most of the suspended solids. Thus, when a secondary algae contacting unit is used the effluent water should be completely clear and a very small clarifier unit comprising a single setting basin of the type illustrated in FIG. 2 should be adequate to remove the small amount of solids primarily consisting of filaments broken from the algae bed of the secondary algae contacting unit.

In some Southern locations, the use of a housing with transparent windows may not be necessary to maintain the algae at growing temeratures; however, in many cases it will be desirable in all climates that the amount of direct sunlight be controlled. This may be accomplished by any suitable means such as shade means or a glass housing to filter the ultra violet rays from the sunlight as shown in FIG. 4. If the unit is operated completely submerged, the liquid above the algae bed will protect it from any damage from direct rays of the sun and no shade means will be necessary.

During the winter months it is desirable that the algae be maintained at temperatures above freezing, and preferably above 50° F. since the algae will stop growing at very low temperatures, and will grow at a very slow rate at temperatures below about 40° F.

Artificial light fixtures are illustrated in the embodiment shown in FIG. 4 and such provision may be made for artificial light of wave lengths suitable for algae growth which for the various species of filamentous algae include light in the visible range. Such artificial light may be provided to cause the algae to continue growing throughout the night hours and it may also permit supplemental light to be provided during the winter season when the sunlight may be inadequate on many days.

The means provided in the illustrated embodiments of the present invention for rotating the algae filter bed provide desired filtering contact between the sewage and the algae bed, and also permit the algae to have sufficient contact with light to promote natural growth. A further important function of the continuing alternate submergence of the algae within the liquid and its rapid movement through the atmosphere is that the algae may be thereby maintained wet which is necessary for its growth. For many rotor sizes the motor means may rotate the algae bed at sufficient speed to provide sufficient centrifugal force to maintain the algae wet, and also at sufficient speed to prevent any substantial drying of the algae bed during its passage through the atmosphere. The centrifugal force will vary in accord with the well known formula $$F = \frac{Mv^2}{r}$$

in which M is the mass, F is the centrifugal force, r is the radius and v is the velocity. For most rotor sizes a peripheral speed or velocity of about ½ foot per second has been found to be adequate, but it is recognized that the addition of water to the exposed portion of the algae bed may be require, by spraying or otherwise, for some sizes of rotors for which centrifugal force would not be a practical means of maintaining the algae wet. For such units or for any size unit as may be desired, wetting means such as sprinkler nozzles 73 may be used to provide water to keep the upper portion of the rotating algae bed wet, and to wash light-obscuring solids from the algae bed.

A small sewage processing plant embodying an algae screen filtering unit as the treating means was constructed with a supporting framework, or supporting screen, of spiral configuration, such as that illustrated in FIG. 4. Several layers of hardware cloth spaced ¼ inch apart were wound on a spiral frame mounted on a central shaft. This spiral-shaped supporting screen was mounted horizontally in a tank with about 3 inch spacing between the tank and the screen. Sewage was introduced at one end of the tank, flowing axially along the screen and discharging at the opposite end. The screen was half submerged and for test purposes it was rotated at various rates. The supporting frame work, or screen, was eighteen inches in diameter and about 30 inches long.

The sewage was introduced into the tank and the cylindrical framework was first rotated at relatively slow speeds of up to 3 r.p.m. At these lower speeds, a bacteriological film formed on the wires of the screen very slowly, and at such speeds the suspended solids removal and B.O.D. removal were both very poor. As the speed of rotation was increased above 3 r.p.m., the algae began to appear on the rotor, and at 8 r.p.m. the algae completely replaced the bacterial film within a few hours. With the increased growth of algae, the treatment rate improved unbelievably both from the standpoint of removal of suspended solids as well as reduction in B.O.D.

It was observed that at the slower speeds of rotation the algae could not compete with the bacteria growing on the rotor. At slow speeds, the water tended to drain off the exposed portion of the screen, leaving it only damp. Algae does not grow on damp surfaces, but in water. At higher speeds the centrifugal force tends to hold a considerable amount of water on the exposed portion of the screen, and, of course, the drying time is also materially reduced for each passage of a portion of the rotor above the surface of the liquid. Moreover, at slow speeds, the suspended solids attach themselves to the screen loosely and there is insufficient drag created by movement of the screen through the liquid to dislodge the solids. Any deposit of solids on the rotor tends to block light from the algae causing them to die. Accordingly, at slow speeds, a continuing film of solids and bacteria result wherein treatment is only fair and such treatment as is achieved is entirely bacteriological.

However, by rotating the screen, or providing other means of moving it rapidly through the sewage and alternately into exposure to light, such as sunlight or suitable artificial light in the visible range from red to yellow, and sometimes blue, algae gorwth is achieved; mechanical filtration of the sewage is achieved by contact with the algae; and filament unloading is promoted during the rapid passage of the algae bed through the liquid.

At higher rotation speeds it was observed that the drag is greatly increased which tends to "clean" the submerged portion of the screen, allowing the growth of algae, but limiting the length of algae filaments. As algae growth developes the solids are attached to the algae filaments rather than to the supporting frame work, and as solids cover up each extended filament portion, the filament breaks off with its attached solids in much coarser sections or particles which are heavy and settle readily into an easily compacted mass.

It was found that algae grows at a more prodigious rate when properly fed than bacteria, replacing the bacteria on the rotor entirely at higher rotation speeds, and the rate and degree of sewage treatment is far higher than any previously known method of treatment.

In the initial tests of the small sewage treating unit described above, paper was screened from the raw sewage through a ¼ inch screen. In subsequent tests it was found that a clarifier such as clarifier 20, can be used with a ten minute settling period to remove the paper and between 25% to 40% of the light obscuring solids from the incoming raw sewage. When dried, the paper serves as fuel for the incineration of the initial 25% to 40% solids as well as other solids removed from subsequent treatment of the sewage.

The small algae screen, comprising a spiral frame work with an outside diameter of 18 inches, approximately 30 inches long, was used in a series of tests to process the screened raw sewage. In one test this small algae contacting unit was followed by clarification in a 4 inch deep sedimentation tank, achieving the removal of 98% of the suspended solids and a reduction of the B.O.D. by 80% in only 18 minutes total processing time. The effluent from the clarifier was perfectly clear. Final chlorination could be used to reduce the B.O.D. by an additional 10 to 15%. Such an effluent is suitable for adilution in any stream in the United States.

In another test of the small algae contacting unit, 100% suspended solids removal was achieved with 10 minute algae contact (detention time) and 8 minutes detention time in a series of 4 inch deep elongated settling tanks. The biochemical oxygen demand or B.O.D. removal in this test was above 90%.

In a number of tests of the small laboratory algae screen, suspended solids removal of 95% to 100% were consistently obtained with B.O.D. reductions ranging from 70% to above 90% depending on the strength of the sewage and other variables. The small laboratory unit thus performed in a single stage of treatment the functions normally called primary and intermediate treatment. The algae rotors used were very small compared to equipment normally used to produce such results, and the total detention time in all tests using the algae bed filter was less than 30 minutes. Complete solids removal could be obtained in a single stage of algae contact by a larger primary algae treatment unit having greater detention time therein, or the use of a secondary algae treatment unit to treat the effluent liquid from the clarifier following the primary algae treatment stage.

It has been observed that after sedimentation a far greater percentage of reduction in B.O.D. has taken place than can be explained by mere removal of the solids. This is attributed to the considerable consumption as food of the dissolved solids by the algae; however, in the foregoing use of the single small algae screen, the contact was too brief to reduce the B.O.D. by more than 70% to 90%. The complete clarification of the effluent from this single unit would make possible further clarification by use of a submerged rotating algae screen because the clarified effluent will admit light rays to a much greater depth. Thus a secondary algae screen may be employed for removal of additional solids or, if desired, the calrified effluent could be given final treatment by bacteriological means. A very small clarification unit could be employed after the final clarification stage to remove the deposit of algae filaments scoured from the rotating screen of the secondary unit.

The rotating algae frame work may be of any suitable design to provide support for the algae. It is preferred that the algae supporting foraminous member, which may be a cross-grid screen, be provided with openings of not greater than 2 inches in the smallest measurement across each opening. The open spaces of the supporting screen or the openings of the foraminous support permit flow of sewage through the algae. It is presently preferred that a screen with cross-grid of members or wires of non-corrosive metal be used.

The screens may be provided in any desired configuration such as, for example, the spiral shown in FIG. 4; the helix shown in FIG. 5 or as the series of vertical discs shown in FIG. 6. In each instance, it is preferable but not necessary that the flow of sewage be axially along the rotating screen member. By rotating the framework and its associated mat of algae cross-current to the flow of sewage contact with all parts of the sewage flow is very greatly increased, and the highly important functions of exposure of all parts of the algae to sunlight or illumination is provided.

As previously noted, it is within the contemplation of this invention to provide artificial light in order that the algae may be caused to grow over a 24 hour period. However, in tests of small units, it has been found that the screening action of the algae continues during the night hours even in the absence of artificial light with effective removal of solids.

In tests of a clarifier 16 inches wide having a flow depth of only 4 inches, raw sewage containing a dissolved oxygen content of 1 p.p.m. or less it was found that an average of 37% of raw sewage solids could be removed. By increasing the dissolved oxygen to 2 p.p.m. with the same dosage rate, 58% of the suspended solids were removed, the linear flow distance being 10 feet. In the preferred embodiment of this invention, the algae filtering unit provides dissolved oxygen and in addition particles of filaments from the algae. Such a system provides dissolved oxygen near the saturation point and larger solid aggregates are bound together by particles of filamentous algae. The clarifier removed 98% of the suspended solids from sewage after algae filtration. These test results are based upon composite samples with influent sewage of approximately the same strength, and the results are the averages of multiple tests.

Sewage solids content for the treatment of these samples ran from as low as from 14% to as high as 25% depending on the degree of compression applied. In the practice of my invention at least 20% solids content can be produced. With algae treatment the sludge will be more compact and tightly bound by algae filaments, and slightly higher solids content can be obtained. By comparison, sludge from a conventional clarifier and excess activated sludge were introduced in the clarifier of this design to determine the effect, if any, on sludge compaction where solids were settled in the absence of dissolved oxygen. In either case did any compaction or concentration occur, the removed sludge being the same character as the original sludge.

Sludge from the activated sludge process does not form compacted sludge even though tremendous amounts of oxygen are introduced from the atmosphere to help activate the sludge. The introduction of oxygen in this process, however, is accompanied by vigorous agitation and no sedimentation occurs while oxygen is dissolved in the sewage. It is well recognized in the various forms of activated sludge treatment, that the activated sludge is very putrescible and in many cases it must be reaerated for considerable periods before being reintroduced into the system. Digester supernatent is particularly objectionable since it has a very high B.O.D. as compared with raw sewage. When the sewage from such a process is passed to the clarifier, anaerobic bacterial action resumes and deep sedimentation tanks with prolonged retention times are used. Such sludge does not contain dissolved oxygen and a compacted sludge cannot be obtained.

With the present process, the solids settle far more quickly in the clarifier than in conventional means and shallower tanks may be used. The sludge from this process is freely drainable so that it can be removed by scrapers drawing the sludge up an incline to the surface of the tank. As shown in FIGS. 2 and 3, the inclined end or side of the tank is extended above the liquid level whereby scrapers compress the sludge, squeezing out sufficient water to increase the solids in said sludge to 14% or higher (compared with about 5% solids in comparable sludge pumped from the clarifier). The water drains back into the tank leaving a fairly dry sludge, highly compacted, which is dumped onto a conveyor belt. Compression rollers mounted above the conveyor belt squeeze out additional moisture to increase the solids to 20% or higher. The sludge so compressed and partially dried contains a high degree of organic matter and is not difficult to incinerate.

As previously noted, a very shallow clarifier, only 4 inches deep, having settling trough 16 inches wide and several feet long has been successfully tested. For commercial installations, somewhat deeper troughs would be required; however, the settling depth may be relatively much more shallow (for example 5 feet or less) than the very deep (sometimes 10 feet deep or more) tanks used in conventional clarifiers.

The applicant has in the drawings and specification presented detailed disclosures of embodiments of the invention, but it is to be understood that, within the spirit and scope of this invention, the invention and mechanical features thereof are susceptible of modifications, structural changes, use of alternate devices as components of the whole apparatus, and various applications or uses of the whole or subcombinatitons of said apparatus. Accordingly, applicant does not intend to limit the invention to the specific form disclosed but intends to cover all modifications, changes, subcombinations, alternate constructions and methods falling within the scope of the principles taught herein, and as specified in the claims.

I claim:

1. A process for removing solids from sewage comprising flowing said sewage into contact with a bed of living filamentous non-microscopic algae to oxygenate said sewage to inhibit the growth of anaerobic bacteria and filtering a portion of said sewage through said bed of filamentous algae to remove solids therefrom by the collection of said solids upon filaments of said algae, moving said bed of algae relative to said sewage to break off solids-loaded filaments from said algae, settling said oxygenated sewage solids and said solids-loaded filaments from said liquid as a sludge of sewage solids separated from said liquid by settling said solids and removing said sludge from said sewage liquid.

2. The process of claim 1 in which said step of settling oxygenating sewage is conducted in a clarifier, and said separated sludge is compacted by lifting said sludge above the surface of said liquid and compressing said sewage to remove water therefrom to produce a sludge having in excess of about 14% solids by weight.

3. A process for treating sewage comprising the steps of flowing said sewage into contact with a supporting means having attached thereto a bed of living, filamentous, non-microscopic algae, said algae being alternately lowered in said sewage and raised sufficiently to expose it to light to promote the growth of said algae, flowing a portion of said sewage through said bed of algae to filter solids therefrom, and maintaining said algae wet during its exposure to light.

4. The process of claim 3 in which said moving bed of algae is supported by a foraminous member to facilitate the flow of a portion of said sewage through said bed of algae to filter solids therefrom by collection of solids upon filaments of said algae, and said foraminous member is rotated about an axis to alternately submerge a portion of said algae in said sewage and to raise it above the surface of said sewage, said axis being prallel to the direction of sewage flow and said rotation being at a rate sufficient to maintain said algae wet during rotation.

5. The process of claim 4 in which said rate of rotation is sufficient to provide sufficient scouring action to prevent sewage solids from adhering to said foraminous member and to cause solids-loaded filaments to break off of said algae.

6. The process of claim 5 including the further steps of conveying said sewage to a clarifier after said sewage has been in contact with said living algae, settling said sewage in said clarifier, removing sludge from said clarifier by lifting said sludge above the surface of said sewage and compressing it to remove water therefrom to produce a compact sludge having in excess of about 20% solids by weight.

7. The process of claim 6, including the further steps of conveying the liquid from said clarifier, and chlorinating said liquid.

8. The process of claim 6 in which said removal and compression of said sludge is by means of a conveyor means having an upwardly inclined bottom surface extending above the surface of liquid in said clarifier, said conveyor means further including a scraper blade movable upwardly along said bottom surface, portions of said sludge being moved upwardly above the surface of said sewage by movement of said scraper upwardly along said bottom surface whereby said removed sludge is lifted and compressed between said scraper blade and said bottom surface.

9. The process of claim 8 including the further steps of compressing said sludge between rollers to remove additional water and drying said compressed sludge.

10. The process of claim 3 including the step of wetting the algae above the surface of said liquid by conveying water onto the upper portion of said moving bed of algae.

11. Apparatus for the treatment of sewage comprising a container, means for introducing a body of sewage into said container, a bed of living, non-microscopic, filamentous algae within said container, a supporting means, for said living algae within said container to which said algae are attached, means for alternately lowering at least a portion of said algae and said supporting means in said body of sewage and raising said portion of said algae and said supporting means to expose said algae to light while maintaining said supporting means and algae attached thereto wet so as to promote the growth of said algae, and means for flowing a portion of the sewage through said bed of algae to filter solids therefrom.

12. The apparatus of claim 11 including means for conveying sewage from said container to a clarifier, said clarifier comprising a settling tank, means for removing settled solids from said settling tank, and an outlet for effluent liquid.

13. The apparatus of claim 12 including means for conveying a portion of said effluent liquid from said settling tank to said supporting means, and means for spraying said portion of effluent liquid onto the upper portion of said supporting means to maintain algae wet.

14. The apparatus of claim 11 in which said light is sunlight.

15. The apparatus of claim 11 in which said light is artificial light.

16. The apparatus of claim 11 in which at least a portion of said supporting means is alternately raised above the surface of said body of sewage and lowered below said surface.

17. The apparatus of claim 16 including means for adding water to the algae while raised above the surface of said sewage liquid to maintain it wet.

18. Apparatus for removing suspended solids from sewage comprising (a) means for oxygenating and filtering said sewage, said means including means for introducing non-microscopic algae within said container, supporting means for said algae to which said algae are attached, means for alternately lowering at least portion of said algae and said supporting means in said body of sewage and for raising said supporting means in said body of sewage and for raising said portion of said suporting means and algae attached thereto sufficiently to expose it to light while maintaining said supporting means and said algae attached thereto wet so as to promote the growth of said algae, and means for flowing a portion of the sewage through said bed of algae to filter solids therefrom (b) a settling tank for the separation of suspended solids from said oxygenated sewage; and (c) means for removing said separated solids from said settling tank.

References Cited
UNITED STATES PATENTS

| | | | |
|---|---|---|---|
| 3,188,288 | 6/1965 | Smith | 210—11 |
| 3,335,081 | 8/1967 | Elnaggar | 210—17X |
| 1,301,532 | 4/1919 | Allen | 210—526X |
| 3,356,609 | 12/1967 | Brummer | 210—10X |
| 1,864,778 | 6/1932 | Tark | 210—10X |
| 3,462,360 | 8/1969 | McKinney | 210—14X |

J. L. DECESARE, Primary Examiner

U.S. Cl. X.R.

210—151, 526